Patented Apr. 28, 1936

2,038,947

UNITED STATES PATENT OFFICE 2,038,947

PROCESS OF MANUFACTURING METHYL ETHER OF TERTIARY BUTYL META CRESOL

August Julius Herman Maschmeijer, Amsterdam, and Enno Takens, Ouderkerk, near Amsterdam, Netherlands, assignors to A. Maschmeijer Jr. Inc., New York, N. Y., a corporation of New York No Drawing. Application June 7, 1934, Serial No. 729,530

1 Claim. (Cl. 260—150)

The invention relates to a process of manufacturing the methyl ether of tertiary butyl meta cresol containing the butyl group in the para position with respect to the methyl group, or 1-methyl 3-methoxy 4-tertiary butyl benzene.

It has been proposed to prepare alkylated derivatives of the methyl ether of meta cresol by treating this compound with alcohols in the presence of sulphuric acid. The well-known method for introducing alkyl groups in aromatic hydrocarbons by condensing the same with aliphatic alcohols in the presence of concentrated sulphuric acid as a condensing agent does not lead to practical results in this case. When treating phenol ethers with the aliphatic alcohol and concentrated sulphuric acid in the usual way it appears that not only substitution of an alkyl group but also sulphonation reactions occur.

It has been tried to avoid sulphonation by using dilute sulphuric acid at elevated temperatures (United States Patent No. 1,927,136). In this case, however, the reaction is very slow and according to the said specification the time of reaction is about 15–20 hours.

We have found that 1-methyl 3-methoxy 4-tertiary butyl benzene can be manufactured in a very satisfactory manner by reacting tertiary butyl alcohol with an excess of meta cresol methyl ether in the presence of sulphuric acid of a concentration between 85 and 95% in a proportion corresponding to 2–4 kg. of the 95% acid per kg. of tertiary butyl alcohol at a temperature not exceeding 20° C.

According to the present process the butyl group is introduced practically exclusively in the para position with respect to the methyl group. Only very small amounts of the other isomers are formed, the said isomers being liquids, in contradistinction with the para compound which has a melting point of 23–24° C.

As compared with the process according to the United States Patent No. 1,927,136 the present process shows the following advantages:

1. The amount of sulphuric acid required is only 2–4 parts by weight, calculated on the weight of tertiary butyl-alcohol, whereas in the prior process about 15 parts by weight of sulphuric acid of 60–70%, corresponding with about 10 parts by weight of the concentrated acid is used.

2. The time of reaction is only about 30 minutes against about 15–20 hours in the prior process.

3. A very satisfactory reaction is obtained at temperatures not exceeding 20° C. so that heating of the reaction mixture is unnecessary. In the process described in the United States Patent No. 1,927,136 the mixture is heated to a temperature of about 90° C. for a considerable time.

4. The total volume of liquid is much smaller and amounts to only about 18% of the volume used in the prior process.

Accordingly the invention permits obtaining the desired substance with a very good yield with about 1/15th part of the sulphuric acid in about 1/30th part of the time necessary in the prior process and this without any heating being required.

The reaction circumstances indicated above, especially the concentration and the proportion of sulphuric acid used are of substantial value for obtaining the desired result. If the proportion of sulphuric acid is considerably increased or a higher reaction temperature is used, sulphonated products are formed. If the amount of sulphuric acid added is too small the time of reaction is increased and moreover high boiling products are formed, consisting chiefly of the methyl ether of dibutyl meta cresol, which are practically worthless.

Example

To a mixture of 250 gms. of the methyl ether of meta cresol and 75 gms. of tertiary butyl-alcohol we add 150 cm.$^3$ of sulphuric acid of 95% in about 20 minutes at a temperature of 15–20° C.; during the addition of the sulphuric acid the reaction mixture is thoroughly stirred, and the stirring is continued for half an hour after the sulphuric acid has been added.

The mixture is now poured out in water and the sulphuric acid is removed by washing. The washed oleaginous layer is fractionated; the methyl ether of tertiary butyl meta cresol distills between 220 and 230° C.

We claim:

A process of manufacturing 1-methyl 3-methoxy 4-tertiary butyl benzene comprising reacting tertiary butyl alcohol with an excess of meta cresol methyl ether in the presence of sulphuric acid of a concentration between 85 and 95% in a proportion corresponding to 2–4 kg. of the 95% acid per kg. of tertiary butyl alcohol at a temperature not exceeding 20° C.

AUGUST JULIUS HERMAN MASCHMEIJER.
ENNO TAKENS.